United States Patent Office 2,887,466
Patented May 19, 1959

2,887,466
POLYETHYLENE COMPOSITIONS CONTAINING 2-HYDROXY-5-OCTYLBENZOPHENONE

Gerald R. Lappin and Gordon C. Newland, Kingsport, Tenn., assignors to Eastman Kodak Company, Rochester, N.Y., a corporation of New Jersey No Drawing. Application February 14, 1958
Serial No. 715,181

4 Claims. (Cl. 260—45.95)

This invention relates to the stabilization of polyethylene compositions, and more particularly, to the stabilization of polyethylene compositions against deterioration resulting from exposure to sunlight or ultraviolet light.

Polyethylene is subject to deterioration when exposed to ultraviolet light. A number of so-called ultraviolet inhibitors are known which are used to inhibit the deterioration or degradation of many plastic or resin materials. However, some of the most effective of these known ultraviolet inhibitors for such plastic materials as cellulose acetate, polystyrene, polyvinyl chloride and the like are not compatible with polyethylene due to exudation from polyethylene soon after being incorporated therein. Also, there are other common ultraviolet inhibitors that are compatible with, but are not entirely satisfactory stabilizers for, polyethylene. In addition, many effective stabilizers for halogen-containing polymers such as polyvinyl chloride, polyvinylidene chloride, and the like are not necessarily effective stabilizers in polyethylene, as stabilizers in halogen-containing polymers function essentially as halide scavengers while stabilizers in polyethylene do not serve this function. Hence, it is highly unpredictable as to whether a given stabilizer or ultraviolet inhibitor will be compatible with, and a good stabilizer for, polyethylene compositions short of actually testing the material in polyethylene.

It is an object of this invention to provide new polyethylene compositions of high stability against deterioration resulting from exposure to sunlight or ultraviolet light.

It is a further object of this invention to provide novel polyethylene compositions containing an additive that is compatible with, and an effective ultraviolet inhibitor for, the polyethylene compositions.

It is likewise an object of this invention to provide novel polyethylene compositions containing a hydroxybenzophenone ultraviolet inhibitor that will not exude therefrom.

Other objects of the invention will be apparent from the description and claims which follow.

The present invention comprises polyethylene compositions of improved resistance to deterioration due to ultraviolet light having incorporated therein a stabilizing amount of a 2-hydroxy-5-octylbenzophenone which has the following structural formula:

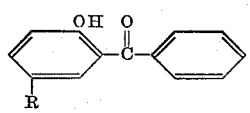

wherein R is an alkyl radical containing 8 carbon atoms, including both straight and branched chain 8 carbon radicals. Typical substituents for R are n-octyl, 1,1,3,3-tetramethylbutyl, 2,2-dimethylhexyl and the like. The preferred stabilizer of the invention is 2-hydroxy-5-n-octylbenzophenone.

The subject ultraviolet inhibitors can be used to stabilize a wide variety of ethylene polymer compositions including both "low-density" and "high-density" polyethylene. Conventional polyethylene, "low-density" polyethylene, usually has a density of about 0.91 to 0.93 and can be prepared by several methods including the method disclosed for Fawcett et al. U.S. Patent 2,153,-553. "High-density" polyethylene usually has a density of about 0.94 to 0.97 and can be prepared by such methods as are disclosed in copending applications of Coover, U.S. Serial No. 559,536, which was filed January 17, 1956, and U.S. Serial No. 613,609, which was filed October 3, 1956. The subject stabilizers can be used as ultraviolet inhibitors for conventional solid polyethylene compositions as well as the so-called polyethylene waxes. The subject inhibitors are of particular utility in thin films or sheets of polyethylene compositions, particularly those about 0.5–100 mils in thickness.

The amount of 2-hydroxy-5-octylbenzophenone employed in polyethylene compositions can be widely varied, the stabilizing amount varying with the particular use to which the polyethylene composition is to be put. Concentrations of 2-hydroxy-5-octylbenzophenone of 0.1% to 10% are more generally used and concentrations of 0.5% to 5% are preferably employed, the concentrations being based on the weight of the polyethylene composition.

The ultraviolet inhibitors of the invention can be incorporated or blended into polyethylene compositions by any of the conventional methods used for blending such materials into resins or plastics. Typical of such methods that can be suitably employed include milling on heated rolls, deposition from solvents and dry-blending.

The ultraviolet inhibitors of the present invention, 2-hydroxy-5-octylbenzophenones, lend to polyethylene compositions improved stability, and more specifically, improved stability against deterioration resulting from exposure to sunlight or ultraviolet light. Thus, polyethylene compositions stabilized in accordance with the invention can be utilized for a wide diversity of applications.

The polyethylene stabilizers of the invention, apart from being effective stabilizers against deterioration resulting from exposure to ultraviolet light, have good compatibility with polyethylene compositions. For example, while the subject 2-hydroxy-5-octylbenzophenones have good compatibility with polyethylene compositions, such closely related hydroxybenzophenones as 2,4-dihydroxybenzophenone, 2-hydroxy-5-methylbenzophenone, 2,4-dihydroxy-5-n-hexylbenzophenone, 2-hydroxy-4-n-octadecyloxybenzophenone, and many other hydroxybenzophenones are not compatible with polyethylene compositions in that these compounds exude from polyethylene compositions after being compounded therein.

The effectiveness of 2-hydroxy-5-octylbenzophenone as stabilizers against photodegradation or ultraviolet light deterioration in polyethylene is illustrated by the following examples of typical polyethylene stabilizer tests.

EXAMPLE 1

Into polyethylene having a molecular weight of about 27,600 and a density of 0.919 was hot-roll-compounded 1% by weight of 2-hydroxy-5-n-octylbenzophenone. The resulting composition was thereafter compression molded into sheets 60 mils thick. Samples of the resulting sheets, including a control sample containing no additive, were exposed to outdoor weathering on a rack facing south at an angle with the horizontal of 36.5 degrees at Kingsport, Tennessee. After 14½ months' exposure, the samples were tested for deterioration by elongation measurements on an Instron tensile tester at a rate of stretch of 100% per minute. The results of the test are summarized by the data in Table 1 below.

Table 1

| Stabilizer | Percent Original Elongation Retained After 14½ Months' Exposure |
|---|---|
| none | 10 |
| 2-hydroxy-5-n-octylbenzophenone | 42 |

None of the 2-hydroxy-5-n-octylbenzophenone exuded from the polyethylene during the course of the weathering and elongation tests.

EXAMPLE 2

The subject stabilizers, 2-hydroxy-5-octylbenzophenones, have good compatibility with polyethylene, which compatibility many closely related compounds do not possess. Several stabilizers at a level of 1% by weight were incorporated in polyethylene by milling on heated rolls, compression molded into 60 mil sheets of polyethylene, and exposed to outdoor weathering as described in Example 1. After 14½ months of weathering, the surfaces of the respective samples were examined for possible exudation of the stabilizer additive. Table 2 below summarizes the results of the compatibility test of several hydroxybenzophenones in the polyethylene samples.

Table 2

| Stabilizer: | Amount of exudation |
|---|---|
| none | None. |
| 2-hydroxy-5-n-octylbenzophenone | None. |
| 2-hydroxy-5-methylbenzophenone | Much. |
| 2,4-dihydroxybenzophenone | Much. |
| 2,4-dihydroxy-5-n-hexylbenzophenone | Much. |
| 2,4-dihydroxy-5-n-dodecyloxybenzophenone | Much. |
| 2-hydroxy-4-n-octadecyloxybenzophenone | Some. |

As can be observed from the information set out in Table 2, 2-hydroxy-5-n-octylbenzophenone has good compatibility in polyethylene, which compatibility other closely related hydroxybenzophenones do not possess.

EXAMPLE 3

Polyethylene samples containing 1% by weight of 2-hydroxy-5-n-octylbenzophenone and no additive were subjected to an outdoor weathering test. The 2-hydroxy-5-n-octylbenzophenone was incorporated into polyethylene having a molecular weight of about 30,000 and a density of about 0.92 by milling on heated rollers in accordance with usual practice. Thereafter, the polyethylene was compression molded into sheets 60 mils thick. Samples containing the additive and the control sample containing no additive were exposed to outdoor weathering on a rack facing south at an angle with the horizontal of 36.5 degrees at Kingsport, Tennessee. The carbonyl content of the samples was determined before exposure and after 131 days' exposure by measurement of the infrared absorption in the 5.82$\mu$ region. The determination of the carbonyl increase gives an early and reliable indication of photo-oxidation in polyethylene. The carbonyl increase in the resulting samples is set out in Table 3 below. Reference is made to the following two publications concerning the determination of carbonyl content by infrared measurements: Rugg, Smith and Bacon, J. Polymer Sci., 13, 535 (1954) and Cross, Richards and Willis, Discussions Faraday Soc., No. 9, 235 (1950).

Table 3

| Stabilizer: | Carbonyl formation (131 days) |
|---|---|
| none | 56 |
| 2-hydroxy-5-n-octylbenzophenone | 6 |

None of the 2-hydroxy-5-n-octylbenzophenone exuded from the polyethylene during the course of the weathering. Similar stability data as set out in Table 3 above was obtained with polyethylene samples containing 1% by weight of 2-hydroxy-5-n-octylbenzophenone prepared as described above with polyethylene samples having a molecular weight of about 30,000 and a density of 0.945.

EXAMPLE 4

Preparation of 2-hydroxy-5-octylbenzophenone.—Boron trifluoride (20 g.) was passed into a suspension of 25 g. (0.11 mole) of p-n-octylphenol and 20 g. (0.16 mole) of benzoic acid in 100 ml. of tetrachloroethane. The mixture was heated on the steam bath for 5 hours and then poured into 500 ml. of 10% aqueous sodium acetate solution. The organic layer was separated and the tetrachloroethane was removed by steam distillation to give the crude product as a viscous yellow oil. This was distilled at reduced pressure to give 22 g. of yellow oil, B.P. 175–180° at 12 mm.

*Analysis.*—Calcd. for $C_{21}H_{26}O_2$: C, 81.4%, H, 8.39%. Found: C, 81.8%; H, 8.31%.

Although the invention has been described in considerable detail with reference to certain preferred embodiments thereof, it will be understood that variations and modifications can be effected within the spirit and scope of the invention as described hereinabove and as defined in the appended claims.

We claim:

1. A polyethylene composition containing dispersed therein 0.1% to 10% by weight of a 2-hydroxy-5-octylbenzophenone as an agent to inhibit deterioration of said polyethylene composition by ultraviolet light.

2. A polyethylene composition containing dispersed therein 0.5% to 5% by weight of 2-hydroxy-5-n-octylbenzophenone as an agent to inhibit deterioration of said polyethylene composition by ultraviolet light.

3. A polyethylene composition containing dispersed therein about 1% by weight of 2-hydroxy-5-n-octylbenzophenone as an agent to inhibit deterioration of said polyethylene composition by ultraviolet light.

4. A polyethylene composition in film form containing dispersed therein 0.5% to 5% by weight of 2-hydroxy-5-n-octylbenzophenone as an agent to inhibit deterioration of said polyethylene composition by ultraviolet light.

References Cited in the file of this patent

UNITED STATES PATENTS 2,372,358    Cook    Mar. 27, 1945